United States Patent
Yu et al.

(10) Patent No.: US 9,339,040 B2
(45) Date of Patent: May 17, 2016

(54) BREAD MAKER

(75) Inventors: Xiaoju Yu, Zhangzhou (CN); Fudong Cui, Zhangzhou (CN); Shangqian Gao, Zhang Zhou (CN); Silong Guo, Zhangzhou (CN); Yen Tung Lee, Zhangzhou (CN)

(73) Assignee: TSANN KUEN (ZHANG ZHOU) ENTERPRISE CO., LTD., Zhangzhou (CN)

( * ) Notice: Subject to any disclaimer, the term of this patent is extended or adjusted under 35 U.S.C. 154(b) by 243 days.

(21) Appl. No.: 13/982,750

(22) PCT Filed: Jan. 17, 2012

(86) PCT No.: PCT/CN2012/070454
§ 371 (c)(1),
(2), (4) Date: Jul. 30, 2013

(87) PCT Pub. No.: WO2012/100696
PCT Pub. Date: Aug. 2, 2012

(65) Prior Publication Data
US 2013/0319254 A1    Dec. 5, 2013

(30) Foreign Application Priority Data

Jan. 30, 2011   (CN) ..................... 2011 2 0033706 U

(51) Int. Cl.
*A47J 27/00* (2006.01)
*A21B 7/00* (2006.01)
*A47J 36/16* (2006.01)
*A21D 2/00* (2006.01)
*G01C 9/06* (2006.01)

(52) U.S. Cl.
CPC . *A21B 7/005* (2013.01); *A21D 2/00* (2013.01); *A47J 36/165* (2013.01); *G01C 2009/066* (2013.01)

(58) Field of Classification Search
CPC ..... A47J 36/165; A21B 7/005; G01P 15/093; G01P 3/36; G01C 2009/066
USPC ............. 99/348, 334; 73/514.26; 250/231.13; 356/28, 27, 139.1
See application file for complete search history.

(56) References Cited

U.S. PATENT DOCUMENTS 4,056,722 A * 11/1977 Ray .......................... 250/231.13
4,779,522 A * 10/1988 Wong .............................. 99/348
4,791,862 A   12/1988 Hoffmann (Continued)

FOREIGN PATENT DOCUMENTS

CN    201958667 U    9/2011

*Primary Examiner* — Reginald L Alexander
(74) *Attorney, Agent, or Firm* — Rabin & Berdo, P.C.

(57) ABSTRACT

A bread maker has a base disposed with a power member, a container, an upper rotating shaft and a lower rotating shaft. The power member is in driving connection with the lower rotating shaft. The lower rotating shaft is in driving connection with the upper rotating shaft. The upper rotating shaft is in driving connection with a mixing and kneading blade situated inside the container. A transmitting plate is disposed in the base with an optical signal transmitting lamp and an optical signal receiver. A through hole perpendicular to an axis disposed on the lower shaft and running through the lower rotating shaft is disposed on the lower rotating shaft. The receiver is in signal connection with the power member. The transmitting lamp and the receiver are respectively located at two sides of the lower rotating shaft. The receiver is in signal connection with the power member.

17 Claims, 14 Drawing Sheets

(56) References Cited

U.S. PATENT DOCUMENTS 5,402,710 A * 4/1995 Chen ............................... 99/348
6,316,765 B1 * 11/2001 Lindemann et al. ..... 250/231.13
7,100,354 B2 * 9/2006 Opper ........................ 60/39.091
2002/0007737 A1 1/2002 Beach

* cited by examiner

BREAD MAKER

FIELD OF THE INVENTION

The present invention relates to a bread maker.

BACKGROUND OF THE INVENTION

The existing bread maker comprises a base, which is disposed with a power member, a container, an upper rotating shaft and a lower rotating shaft. The bread maker is further disposed with a mixing and kneading blade inside the container, the power member is in driving connection with the lower rotating shaft to drive the lower rotating shaft to rotate, the lower rotating shaft is in driving connection with the upper rotating shaft to drive the upper rotating shaft to rotate, the upper rotating shaft is in driving connecting with the mixing and kneading blade to drive the mixing and kneading blade to rotate. When the power member is shut down, the mixing and kneading blade stops rotating, as the mixing and kneading blade may stop in a unsuitable angle, it may influence the following operation.

SUMMARY OF THE INVENTION

The present invention is provided with a bread maker, which overcomes the disadvantages of the existing bread maker.

The technical proposal of the present invention to solve the technical problem is that:
A bread maker comprises a base (100), the base (100) is disposed with a power member (110), a container (120), an upper rotating shaft (130) and a lower rotating shaft (140), the power member (110) is in driving connection with the lower rotating shaft (140), the lower rotating shaft (140) is in driving connection with the upper rotating shaft (130), the upper rotating shaft (130) is in driving connection with a mixing and kneading blade (A) situated inside the container (120);
A transmitting plate (150) is further disposed in the base (100), an optical signal transmitting lamp (151) and an optical signal receiver (152) are disposed on the transmitting plate (150), a through hole (141) perpendicular to an axis disposed on the lower shaft and running through the lower rotating shaft is disposed on the lower rotating shaft (140), the receiver (152) is in signal connection with the power member (110), the transmitting lamp (151) and the receiver (152) are respectively located at two sides of the lower rotating shaft (140) and in the position corresponding to the through hole (141).

In another preferred embodiment, the transmitting lamp (150) is freely sleeved on the outside of the lower rotating shaft (140).

In another preferred embodiment, the base (100) is further disposed with a light blocking box (160), which is sleeved on the lower rotating shaft (140) and covered the transmitting lamp 151 and the receiver (152).

In another preferred embodiment, a driving mechanism is disposed between the upper rotating shaft (130) and the lower rotating shaft (140), the driving mechanism includes an upper connector (171) and a lower connector (172), a guide mechanism to guide the upper connector (171) is further disposed, the upper connector (171) is fixed to the upper rotating shaft (130), the lower connector (172) is fixed to the lower rotating shaft (140).

In another preferred embodiment, the upper rotating shaft (130) is pivot joint to the container (120), the upper connector (171) is disposed with an upper fixed plate (1711) fixed to the lower end of the upper rotating shaft (130) and situated below the container and at least an upper stand base (1712) fixed to the lower end face of the upper fixed plate (1711);
The lower rotating shaft (140) is pivot joint to the base (100), the lower connector (172) is disposed with a lower fixed plate (1721) fixed to the upper end of the lower rotating shaft (140) and at least a lower stand base (1722) fixed to the upper end face of the lower fixed plate (1721);
The container can withdraw back and forth relatively to the base (100) along the direction perpendicular to the axis of the upper rotating shaft (130);
Thereinto: the upper stand base (1712) of the upper connector is abut against the lower stand base (1722) of the lower connector (172), making the upper rotating shaft (130) in driving connection with the lower rotating shaft (140); when the bread maker receives the stop mixing signal, the upper rotating shaft and the lower rotating shaft stops in a proper angle that can prevent the lower stand base of the lower connector interfering the upper stand base of the upper connector to slide along the withdraw direction, making the upper connector separated from the lower connector without interfering.

In another preferred embodiment, the number of the upper stand base (1712) is two, two upper stand bases (1712) are symmetrically situated in two sides of the axis of the upper rotating shaft (130) in the radial direction, the upper stand base (1712) is disposed with a first contact surface (1713) parallel to the axis of the upper rotating shaft (130), the first contact surfaces (1713) of the two upper stand bases (1712) are spaced with interval parallel to each other and symmetrical back to back in radial direction;

The number of the lower stand base (1722) is two, two lower stand bases (1722) are symmetrically situated in two sides of the axis of the lower rotating shaft (140) in the radial direction, the lower stand base (1722) is disposed with a second contact surface (1723) parallel to the axis of the lower rotating shaft (140), the second contact surfaces (1723) of the two lower stand bases (1722) are spaced with interval parallel to each other and symmetrically face to face in radial direction, making the two second contact surfaces (1723) faced to the two first contact surfaces (1713);
thereinto: the proper angle is in the direction the second contact surface parallel to the withdraw direction of the container.

In another preferred embodiment, the guide mechanism includes a base (173), an upper cover (174), a guide base (175) and a spring (176), the guide base (175) is disposed with a pivot end and a withstand end in the lower, the pivot end is pivot joint to the base (173) and located in the lower of the upper cover (174), the spring (176) is disposed between the withstand end and the base (173), the guide base (175) is disposed with a guide wheel (177) to guide the upper connector (171) to cooperate with the lower connector (172).

In another preferred embodiment, the base (100) is disposed with a heat insulation mechanism (200), which includes a heat insulation rack (210), a flexible mechanism (220), a belt driving mechanism, a heat insulation plate set (230), a power (240) and a temperature sensor in signal connection with the power (240), the flexible mechanism (220) can expand and contract along the longitudinal direction of the heat insulation rack (210), the heat insulation block set (230) is connected to the flexible mechanism (220) and the heat insulation block set (230) can fold and unfold along with the flexible mechanism (220), the heat insulation rack (210) is disposed with a heat insulation door, the heat insulation plate set (230) is corresponding to the heat insulation door, the power (230) is in driving connection with the belt driving mechanism, two pulleys of the belt driving mechanism are respectively disposed at the two ends of the heat insulation rack (210) in the longitudinal direction, the flexible mechanism (220) is in driving connection with the belt of the belt driving mechanism.

In another preferred embodiment, the flexible mechanism (220) is disposed with a fixed end and a flexible end (221), the flexible end (221) is connected to the belt;
the heat insulation block set (230) is disposed with at least two heat insulation blocks, which can expand and contract, one of two heat insulation blocks at two external sides when the heat insulation block set (230) expands is fixed to the side of the heat insulation rack (210) corresponding to the fixed end in the longitudinal direction, the external side of the other one is fixed to the flexible end (221).

In another preferred embodiment, the belt is disposed with a microswitch (260), the heat insulation rack (210) is disposed with a baffle (270), the microswitch (260) is coupled to the baffle (270) and in signal connection with the power (240).

Compared to the existing technology, the technical proposal of the present invention has advantages as below:
1. the transmitting lamp and the receiver are disposed in two sides of the lower rotating shaft in the positions corresponding to the through hole, when the lower rotating shaft is rotated to a corresponding angle, the upper rotating shaft is rotated to the corresponding angle, an optical signal can be irradiated to the receiver through the through hole, the receiver receives the optical signal and then sends on-off signal or other control signal to the motor to control the motor to make the upper rotating shaft and the lower rotating shaft stopped in a proper angle, realizing automatic positioning for the following operation, such as taking out of the container.
2. the light blocking box is sleeved on the lower rotating shaft and covered the transmitting lamp and the receiver to prevent outside light interference to the transmitting lamp and the receiver, ensuring the accuracy of controlling

BRIEF DESCRIPTION OF THE DRAWINGS

The present invention will be further described with the drawings and the embodiments.

FIG. 13-1 illustrates the sectional view of the bread maker when the motor is shut down and the upper rotating shaft and the lower rotating shaft are stopped in a proper angle.

FIG. 13-2 illustrates the sectional view of the bread maker of the preferred embodiment of the present invention when the container is drawn out of the base and the upper stand base touches the guide wheel.

FIG. 13-3 illustrates the sectional view of the bread maker of the preferred embodiment of the present invention when the container is drawn out of the base and the guide wheel guides the upper stand base.

FIG. 13-4 illustrates the sectional view of the bread maker of the preferred embodiment of the present invention when the container is drawn out of the base.

FIG. 14-1 illustrates the second sectional view of the bread maker of the preferred embodiment of the present invention when the container is entered into the base and the guide wheel guides the upper stand base.

FIG. 14-2 illustrates the second sectional view of the bread maker of the preferred embodiment of the present invention when the container is entered into the base and the guide wheel guides the upper stand base.

FIG. 14-3 illustrates the third sectional view of the bread maker of the preferred embodiment of the present invention when the container is entered into the base and the guide wheel guides the upper stand base.

DETAILED DESCRIPTION OF THE EMBODIMENTS

Figure 1:
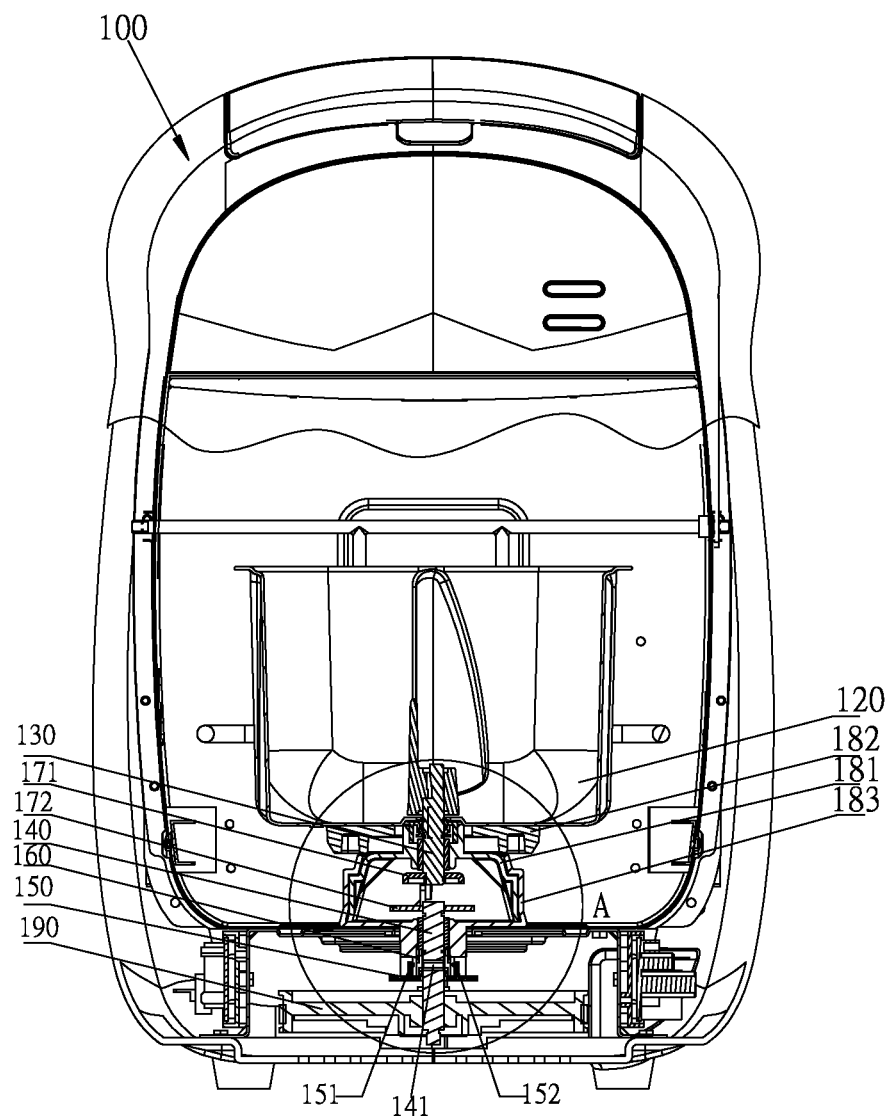
FIG. 1 illustrates the partial sectional view of the bread maker of the preferred embodiment of the present invention in a first view angle.
Figure 2:
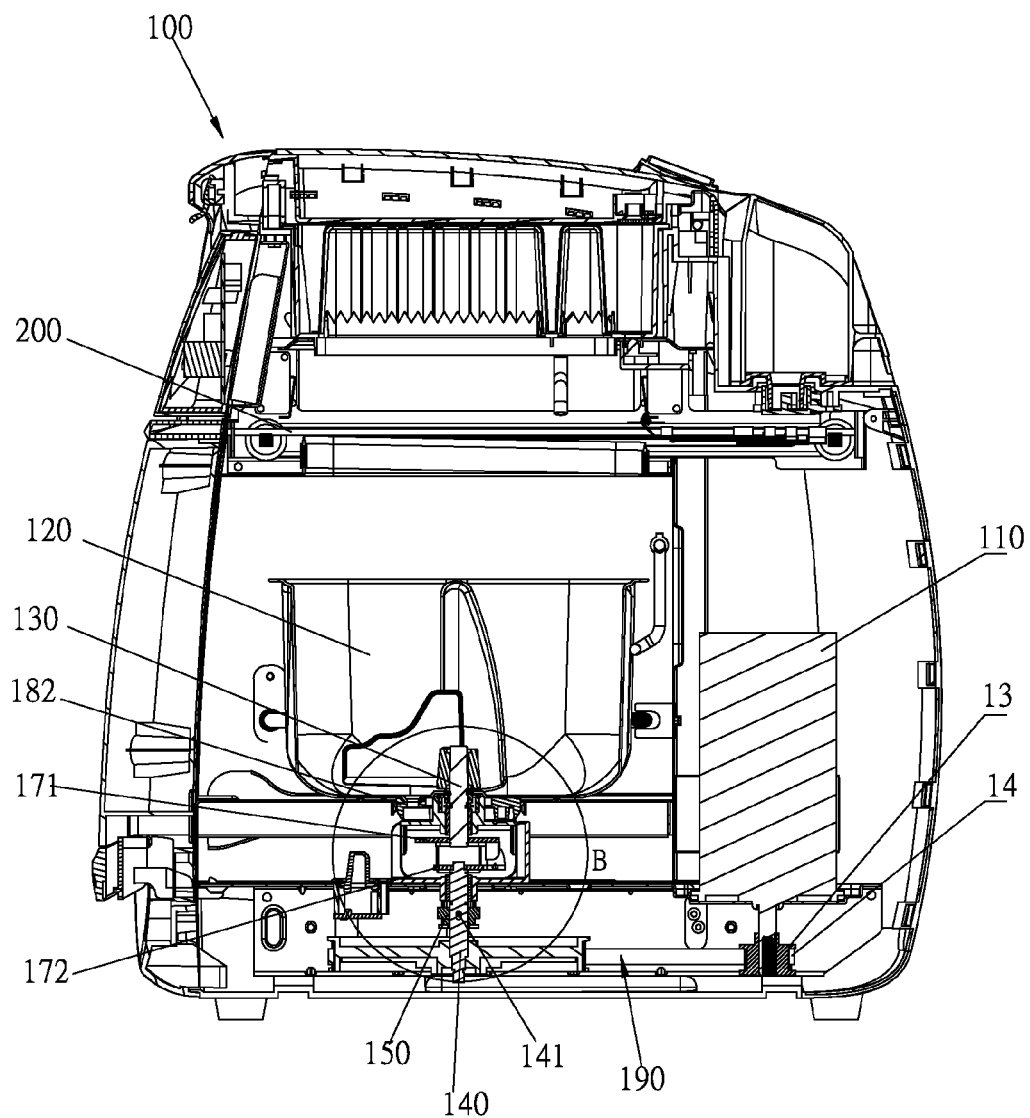
FIG. 2 illustrates the partial sectional view of the bread maker of the preferred embodiment of the present invention in a second view angle.

Please refer to FIG. 1, FIG. 2, FIG. 3 and FIG. 4. A bread maker comprises a base 100, the base 100 is disposed with a power member 110, a container 120, an upper rotating shaft 130 and a lower rotating shaft 140, the bread maker is further disposed with a mixing and kneading blade situated inside the container 120, the mixing and kneading blade can be a mixing blade A.

In this embodiment, the power member 110 is applied with a motor. The power member 110 is in driving connection with the lower rotating shaft 140 by a pulley driving mechanism 190 to drive the lower rotating shaft 140 to rotate when the power member 110 rotates. The lower rotating shaft 140 is in driving connection with the upper rotating shaft 130 to drive the upper rotating shaft 130 to rotate when the lower rotating shaft 140 rotates. The upper rotating shaft 130 is connected to the container 120 by a container base 181 and a fixed plate 182 to connect to the container 120 in rotating way and connect to the mixing blade A in driving way, the driving connection can be a coaxial fixed connection, making that the mixing blade A rotate when the upper rotating shaft 130 rotates.

In this embodiment, the base is further disposed with a transmitting plate 150. The transmitting plate 150 is freely sleeved on the outside of the lower rotating shaft 140. The transmitting plate 150 is disposed with an infrared optical signal transmitting lamp 151 and an optical signal receiver 152. In this embodiment, the transmitting lamp 151 can transmit infrared optical signal, and the optical signal receiver 152 generates on-off signal or other control signal after received infrared optical signal. A through hole 141 perpendicular to an axis disposed on the lower shaft and running through the lower rotating shaft 140 is disposed on the lower rotating shaft 140, the receiver 152 is in signal connection with the power member 110, the optical transmitting lamp 151 and the receiver 152 are symmetrically disposed in two sides of the lower rotating shaft 140 in the positions corresponding to the through hole 141. When the lower rotating shaft is rotated to a corresponding angle, the upper rotating shaft is rotated to the corresponding angle, an optical signal can be irradiated to the receiver through the through hole, the receiver receives the optical signal and then sends on-off signal or other control signal to the motor to control the motor, make the upper rotating shaft and the lower rotating shaft stopped in a proper angle, realizing automatic position.

In this embodiment, preferred, the base 100 is further disposed with a light blocking box 160, which is sleeved on the lower rotating shaft 140 and covered the transmitting lamp 151 and the receiver 152.

Please refer to FIG. 5, FIG. 6, FIG. 7, FIG. 8 and FIG. 9. In this embodiment, a driving mechanism is disposed between the upper rotating shaft 130 and the lower rotating shaft 140. The driving mechanism includes an upper connector 171 and a lower connector 172. A guide mechanism is further disposed to guide the upper connector 171.

Figure 12:
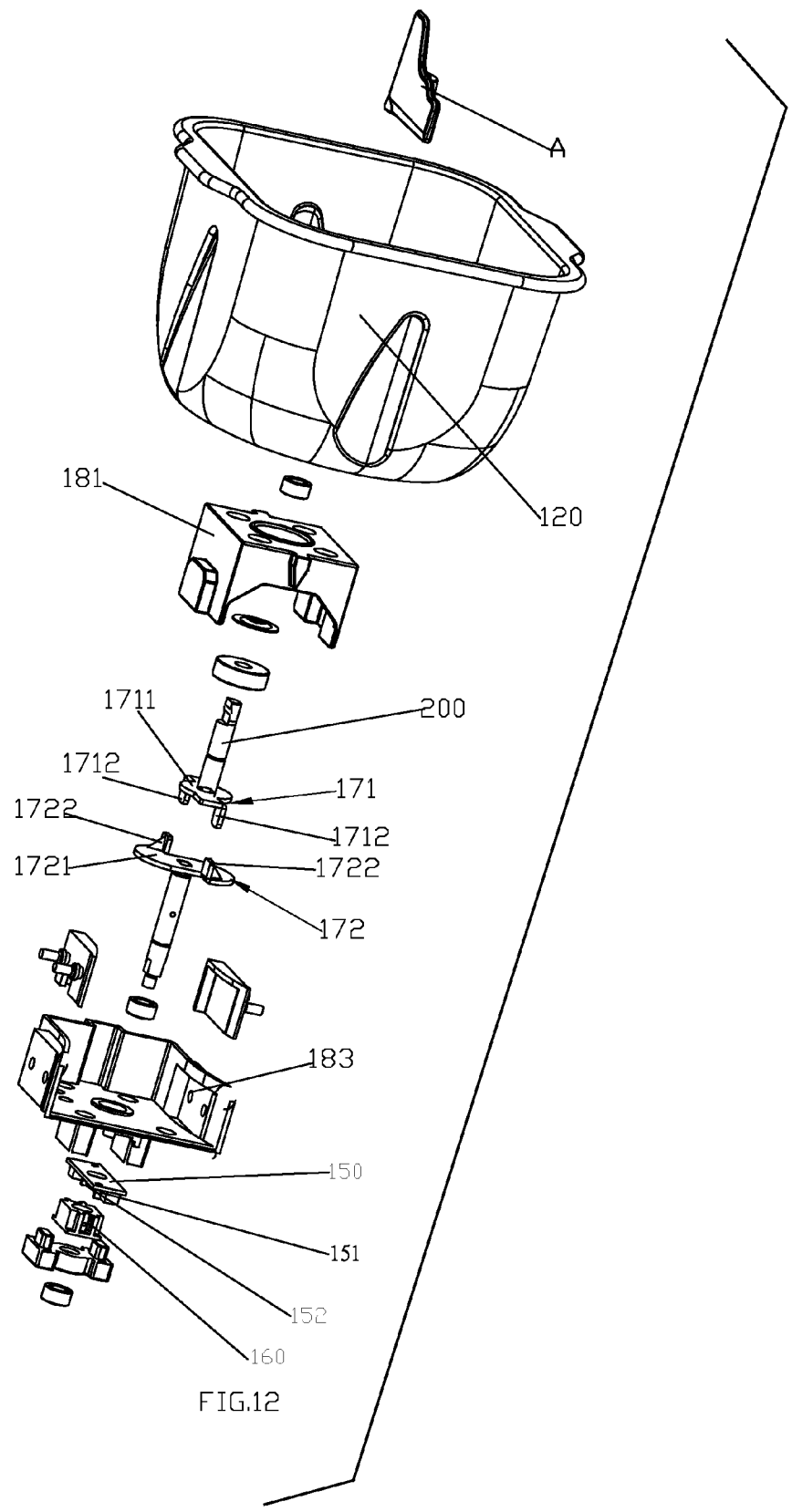
FIG. 12 illustrates the partial breakdown structure of the bread maker of the preferred embodiment of present invention.

Please refer to FIG. 12, the upper connector 171 is fixed to the upper rotating shaft 130, the upper rotating shaft 130 is pivot joint to the container 120, the upper connector 171 is disposed with an upper fixed plate 1711 fixed to the lower end of the upper rotating shaft 130 and situated below the container and two upper stand bases 1712 fixed to the lower end face of the upper fixed plate 1711, two upper stand bases 1712 are symmetrically situated in two sides of the axis of the upper rotating shaft 130 in the radial direction, the upper stand base 1712 is disposed with a first contact surface 1713 parallel to the axis of the upper rotating shaft 130, the first contact surfaces 1713 of two upper stand bases 1712 are spaced with interval parallel to each other, preferred, the first contact surface is a plane parallel to the upper rotating shaft, two first contact surfaces are symmetrical back to back in radial direction;

The lower connector 172 is fixed to the lower rotating shaft 140, the lower rotating shaft 140 is pivot joint to the base 100, the lower connector 172 is disposed with a lower fixed plate 1721 fixed to the upper end of the lower rotating shaft 140 and two lower stand bases 1722 fixed to the upper end face of the lower fixed plate 1721; two lower stand bases 1722 are symmetrically situated in two sides of the axis of the lower rotating shatf 140 in the radial direction, the lower stand base 1722 is disposed with a second contact surface 1723 parallel to the axis of the lower rotating shaft 140, the second contact surfaces 1723 of the two lower stand base 1722 are spaced with interval parallel to each other. Preferred, the second contact surface is a plane parallel to the lower rotating shaft, the thickness of the upper stand base 1712 is smaller than the interval of the two second contact surfaces, two second contact surfaces are symmetrical face to face in radial direction, the axis of the upper rotating shaft and the axis of the lower rotating shaft coincide.

Figures 1, 13:
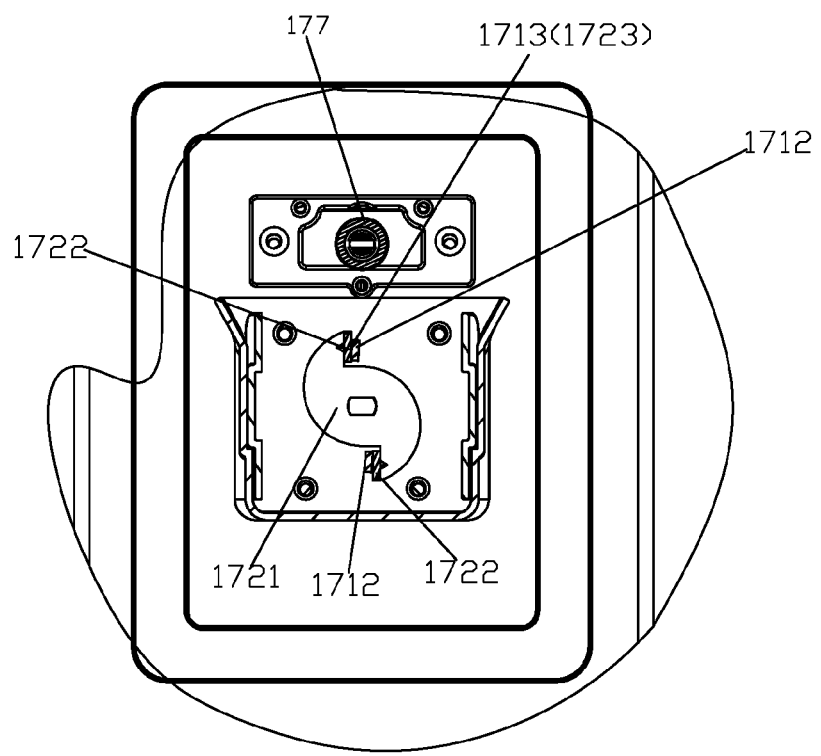
Figures 2, 13:
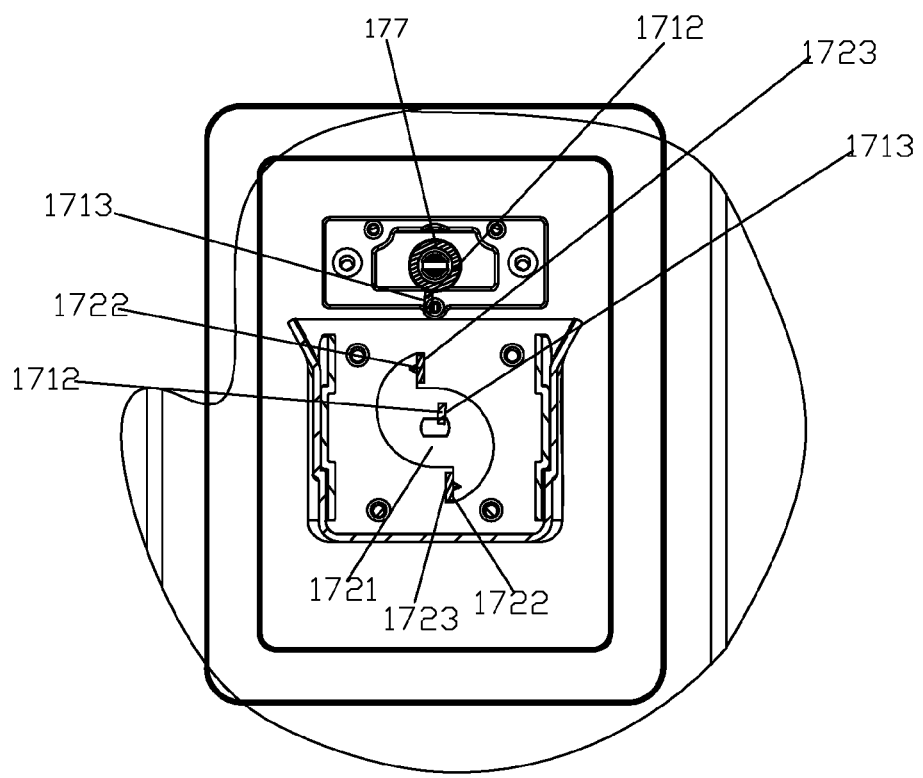
Figures 3, 13:
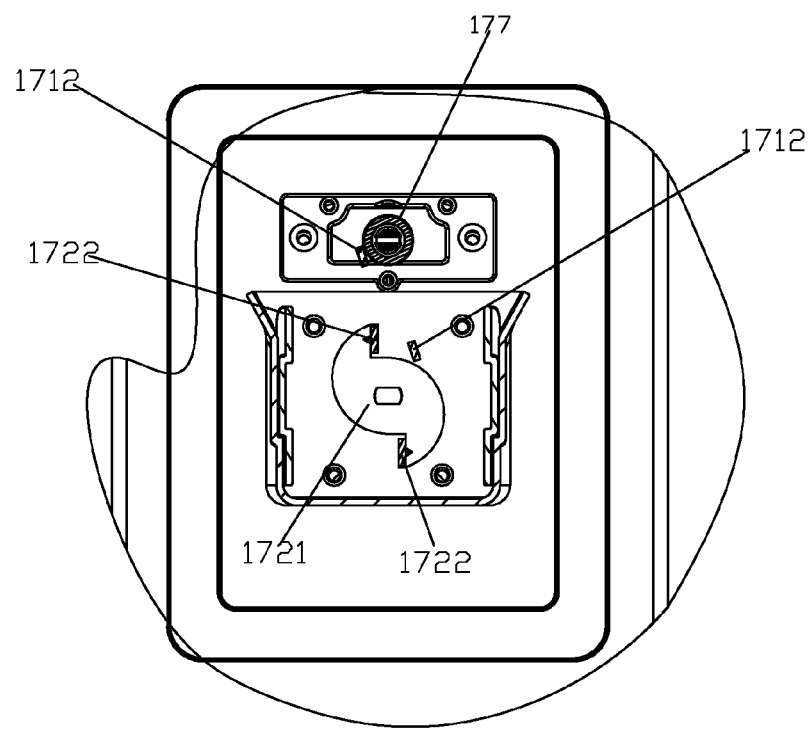
Figures 4, 13:
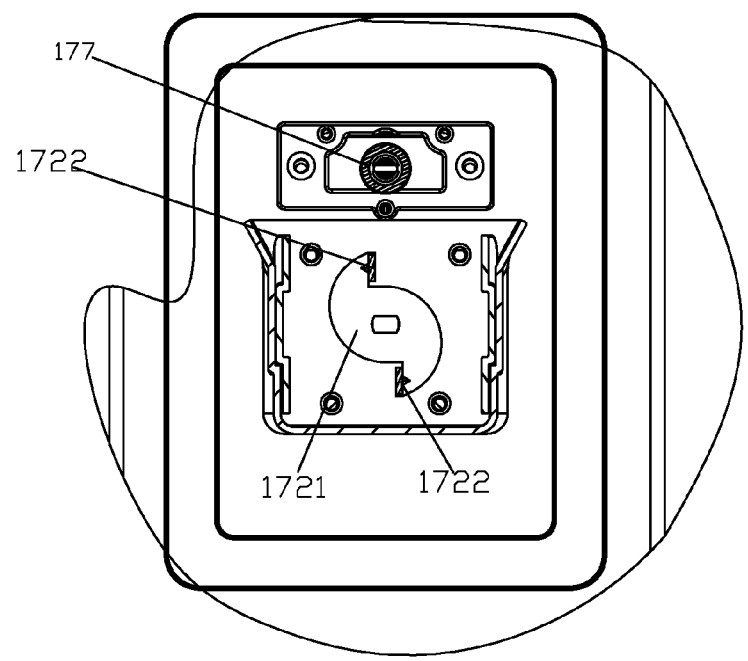
Figures 1, 14:
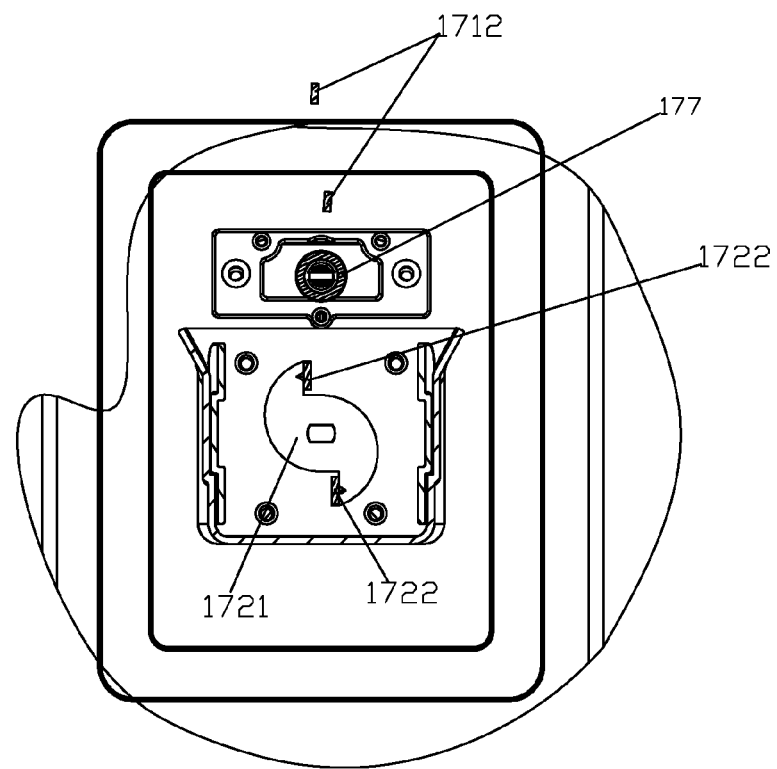
Figures 2, 14:
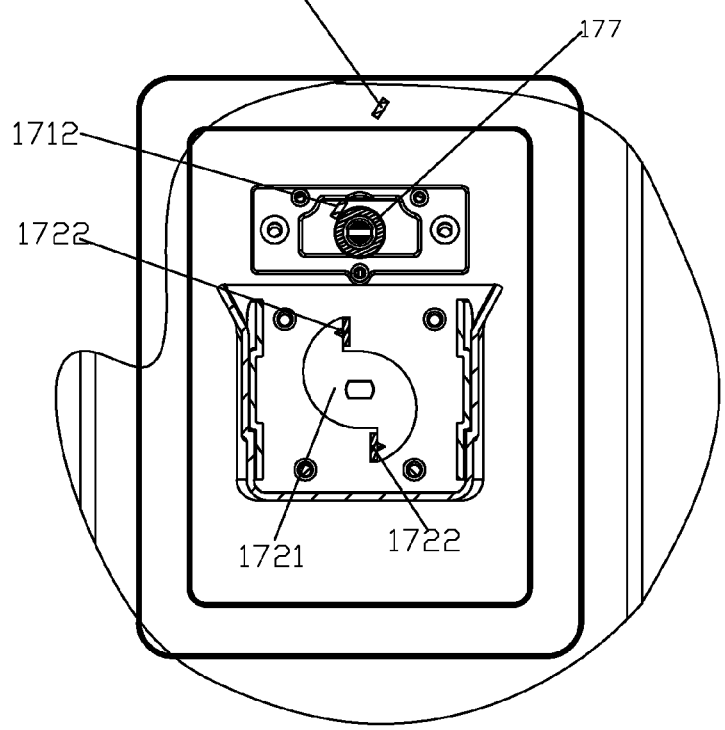
Figures 3, 14:
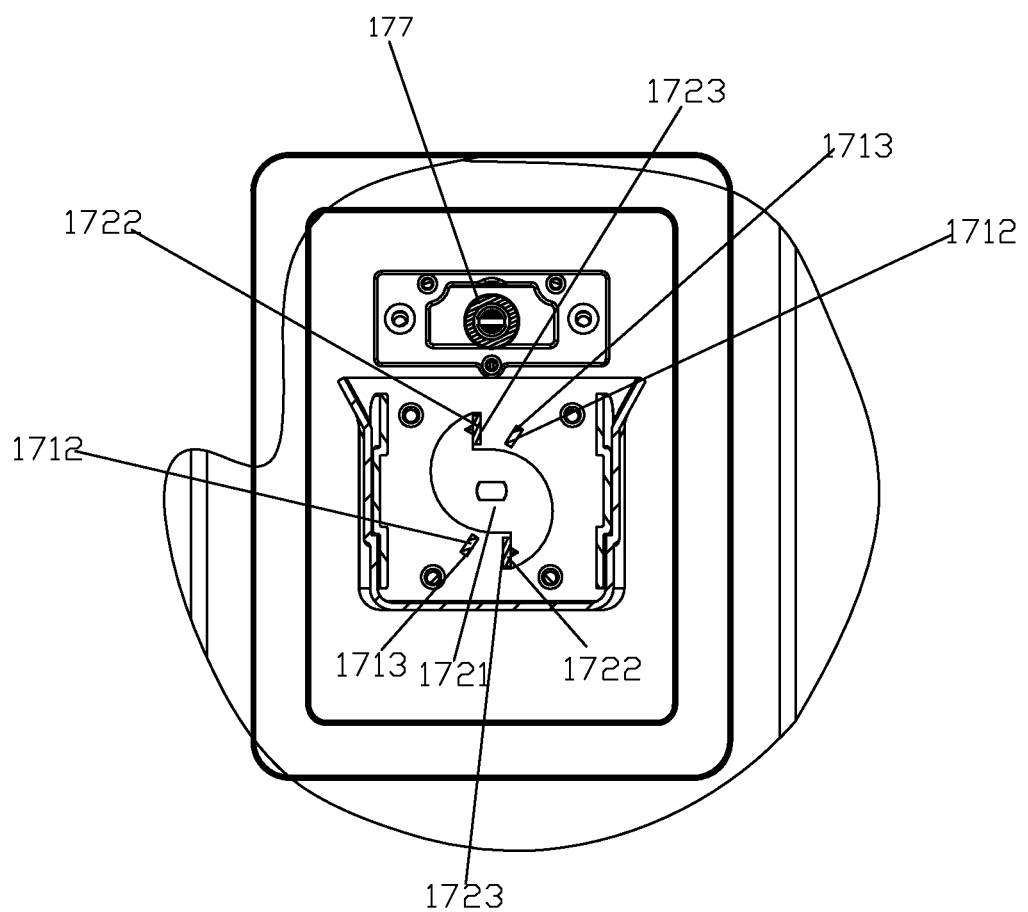

Please refer to FIG. 13-1, two upper stand bases 1712 of the upper connector 171 and the two lower stand bases 1722 of the lower connector 172 are interlaced arranged in circumferential direction, two second contact surfaces are respectively faced to the two first contact surfaces to work in driving, the upper connector 171 and the lower connector 172 are cooperated to make the upper rotating shaft 130 and the lower rotating shaft 140 formed driving connection so that the upper rotating shaft 130 rotates when the lower rotating shaft 140 rotates.

Figure 15:
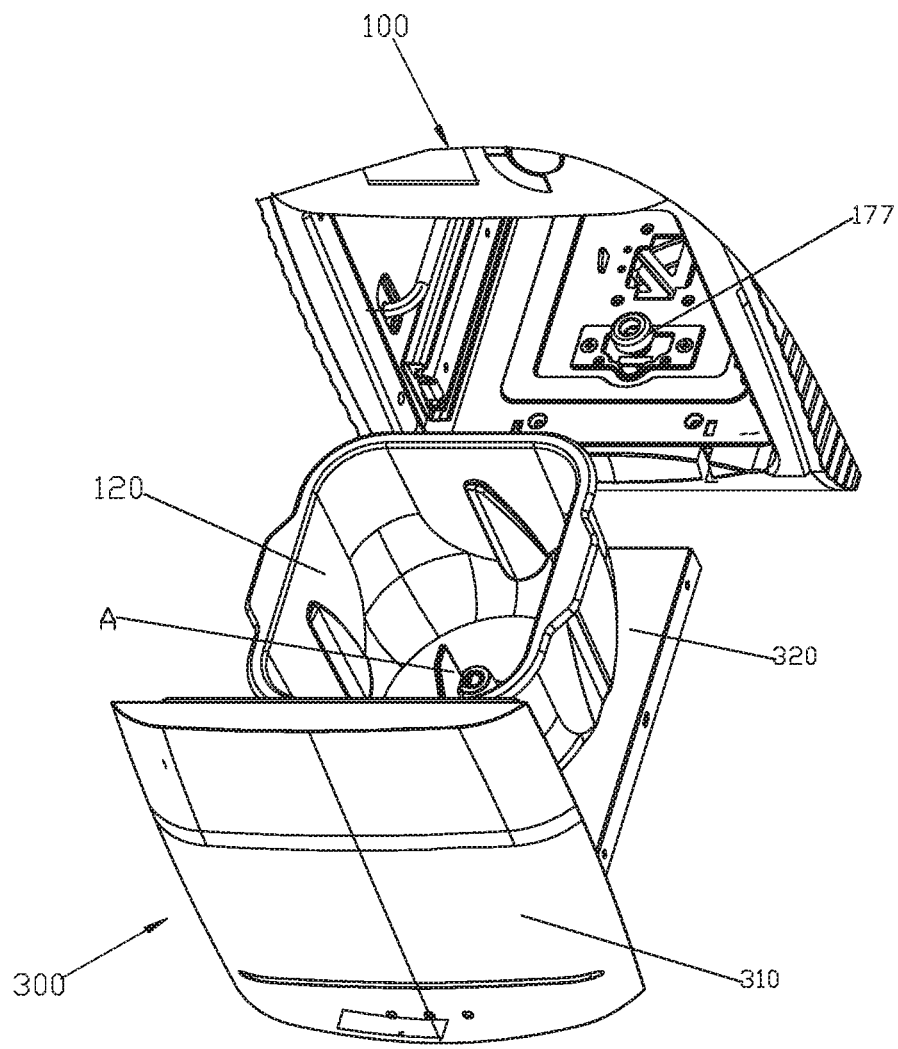
FIG. 15 illustrates the partial structure of the bread maker of the preferred embodiment of the present invention.

In this embodiment, please refer to FIG. 15, the container 120 can withdraw back and forth, for example in the horizontal direction, relatively to the base 100 along the direction perpendicular to the axis of the upper rotating shaft 130, for safely usage, to avoid scald to the user by the container, a withdraw door 300 is further disposed. The withdraw door 300 includes a withdraw plank 310 and a support body 320, the withdraw plank 310 is fixed to the support body 320 vertically. The support body 320 is disposed with an assembly hole, the container 120 is assembled to the assembly hole, the upper connector 171 is situated below the horizontal support body 320. for withdrawing accuracy, a guide mechanism is disposed, for example, it can dispose a rail in the base, the support body can slide along the rail; to reduce friction force, it can dispose with a wheel. To ensure the usage safely and position accuracy, it is better to dispose a removable lock mechanism between the withdraw door and the base and/or the container and the base, for example a lock catch mechanism. For example, the base is fixed with a fixing plate 183, the container is fixed to the container base 181 and the fixed plate 182, the container base 181 is disposed with two lock bases, the fixing plate 183 is disposed with two elastic lock grooves, the lock catch mechanism is realized by the lock bases and the elastic lock grooves.

In this embodiment, when the bread maker receives stop mixing signal, refer to FIG. 13-1, FIG. 13-2, FIG. 13-3 and FIG. 13-4, the optical signal of the transmitting plate 150 can make the upper rotating shaft and the lower rotating shaft stopped in a proper angle, the proper angle is in the direction the second contact surface parallel to the withdraw direction of the container, so that the upper connector can separate from the lower connection without interference. In this embodiment, two upper stand bases and two lower stands bases are symmetrical in radial direction, but not limited to this, it can dispose with just one upper stand base and one lower stand base as request, two stand bases can be asymmetrical in the radial direction, it can ensure the driving direction as well and the upper connector can separate from the lower connection without interference. The guide mechanism includes a base 173, an upper cover 174, a guide base 175 and a spring 176, the base 173 includes a bottom cover 1731 and a round wall 1732 fixed on the bottom cover 1731, one side of the round wall 1732 is disposed with a groove 1733. The upper cover 174 is fixed on the round wall 1732 and disposed with an opening 1741. the guide base 175 is disposed with a pivot end and a withstand end in the lower, the lower end of the guide base 175 is assembled to the base 173 through the opening 1741, making the lower end of the guide base 175 situated below the upper cover 174. The pivot end is connected to the groove 1733 to form rotating connection, so that the guide base 175 can rotate relatively to the groove 1733. The spring 176 is disposed between the withstand end and the bottom cover 1731 of the base 173. The guide base 175 is disposed with a guide wheel 177.

In this embodiment, the guide wheel is used to guide the upper connector 171 to make the upper connector 171 cooperated with the lower connector 172.

Figure 3:
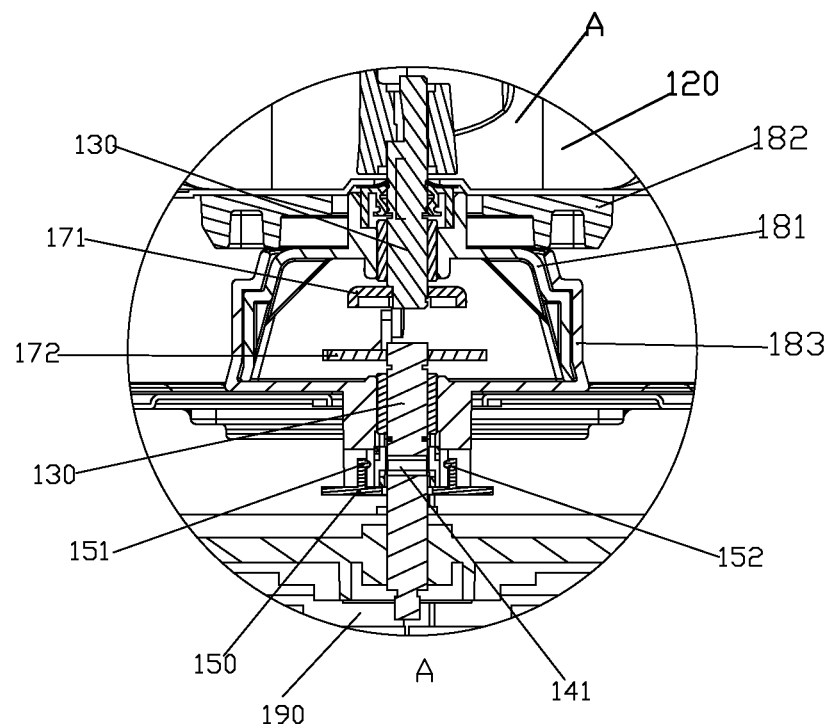
FIG. 3 illustrates the enlargement view of the A part in FIG. 1.
Figure 4:
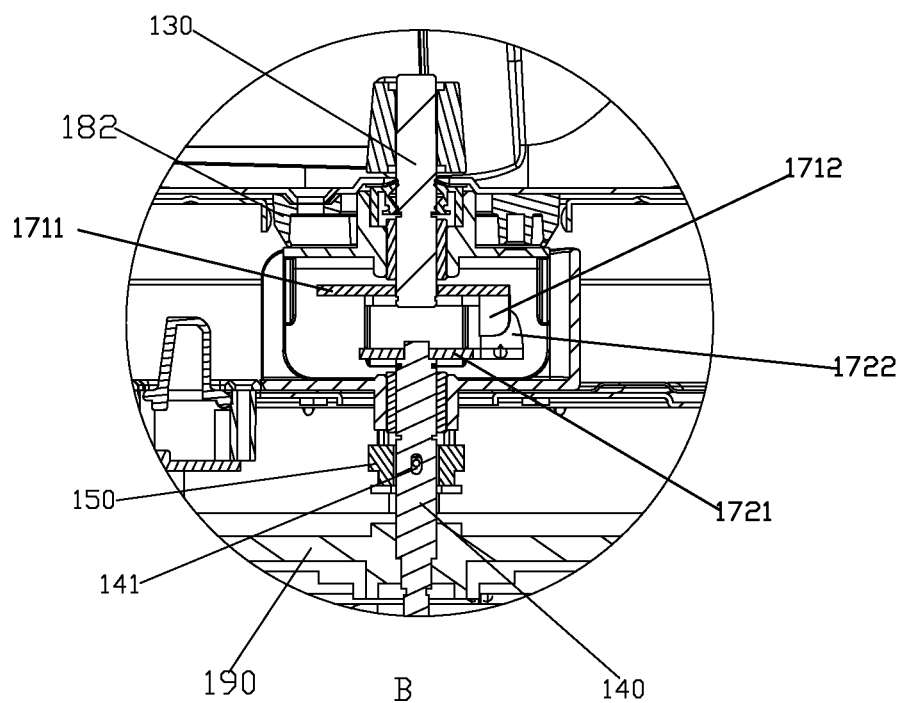
FIG. 4 illustrates the enlargement view of the B part in FIG. 2.
Figure 5:
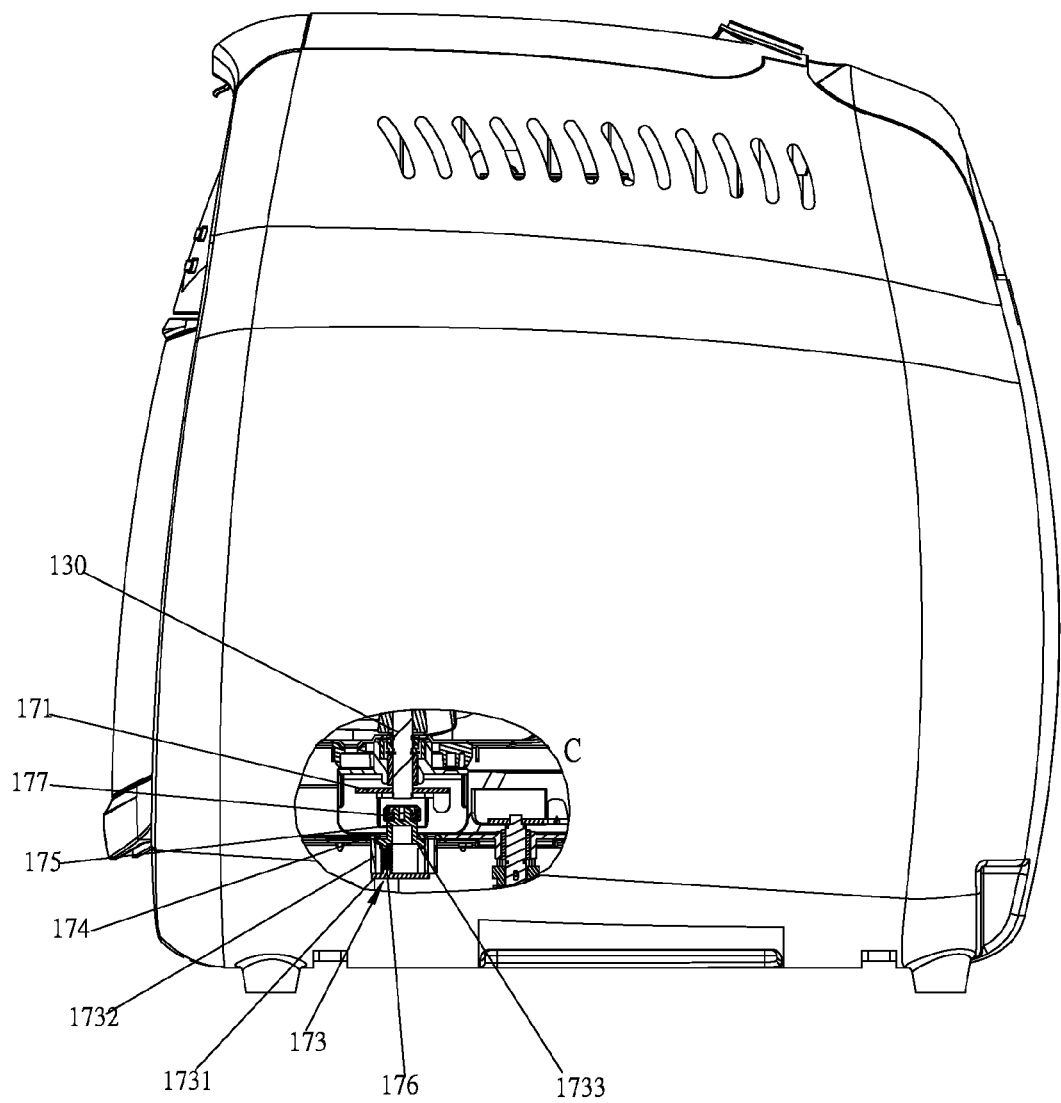
FIG. 5 illustrates the partial sectional view of the bread maker of the preferred embodiment of the present invention in a third view angle.
Figure 6:
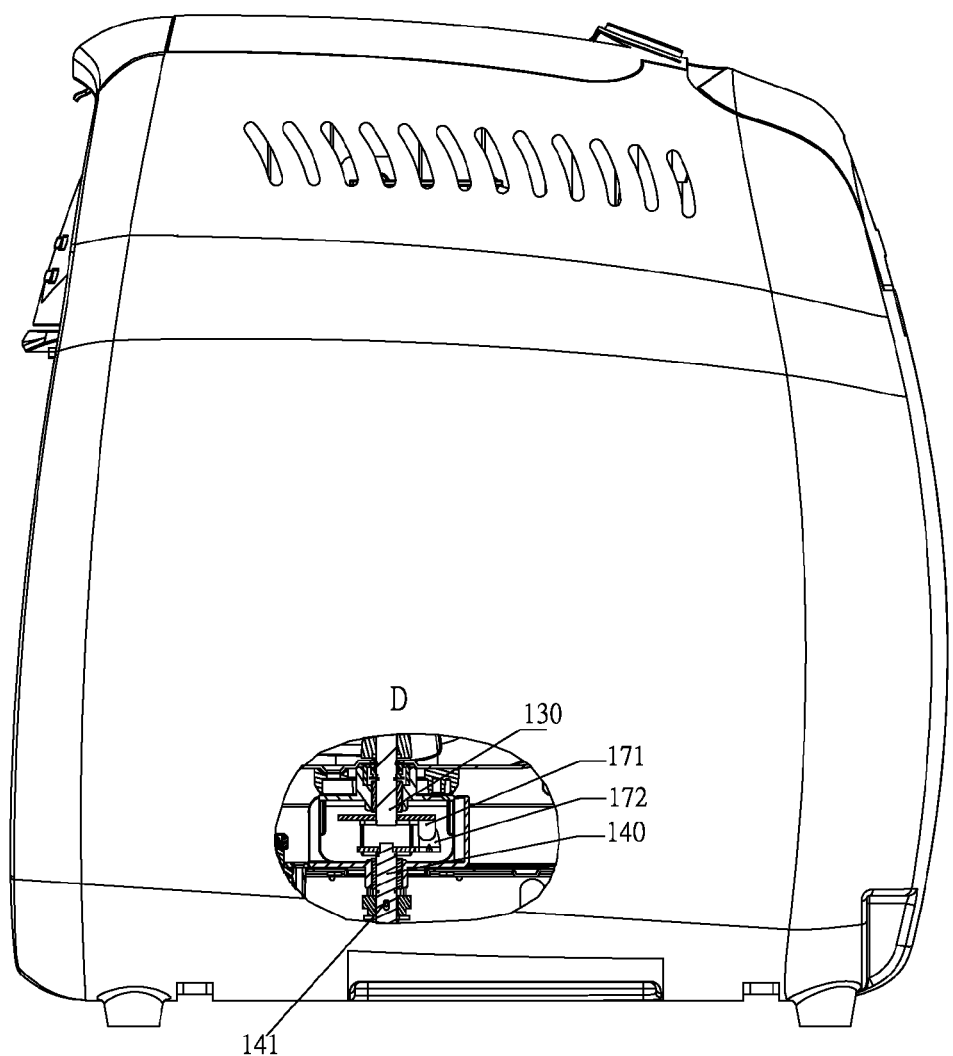
FIG. 6 illustrates the partial sectional view of the bread maker of the preferred embodiment of the present invention in a fourth view angle.
Figure 7:
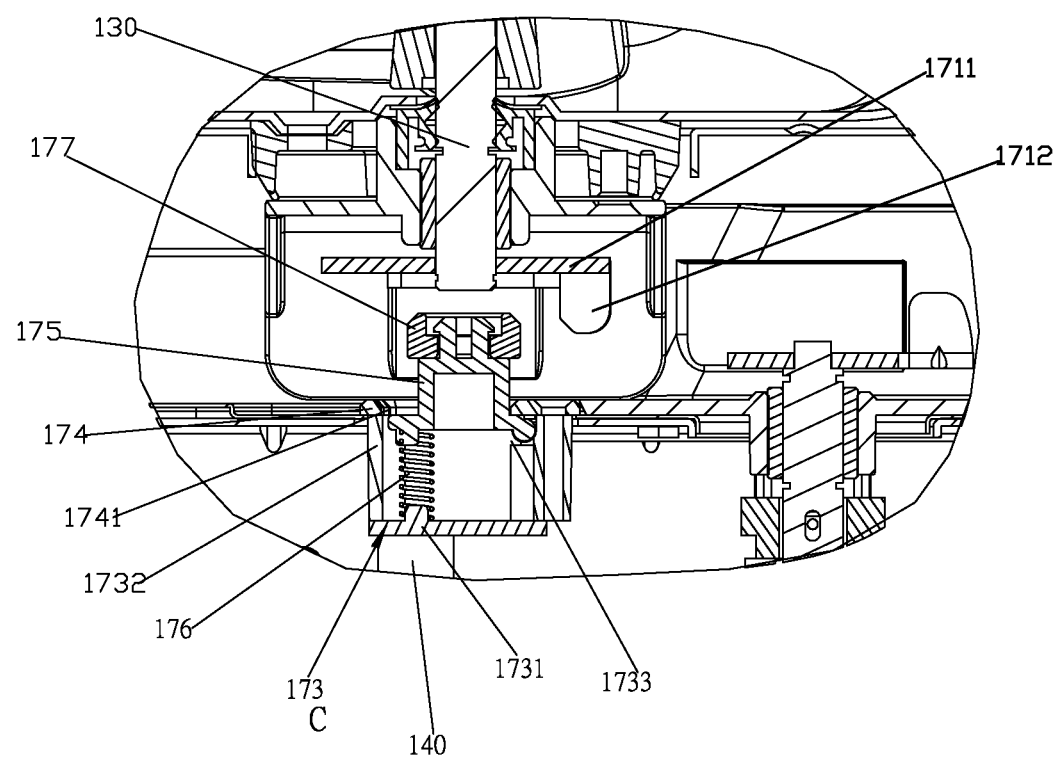
FIG. 7 illustrates the enlargement view of the C part in FIG. 5.
Figure 8:
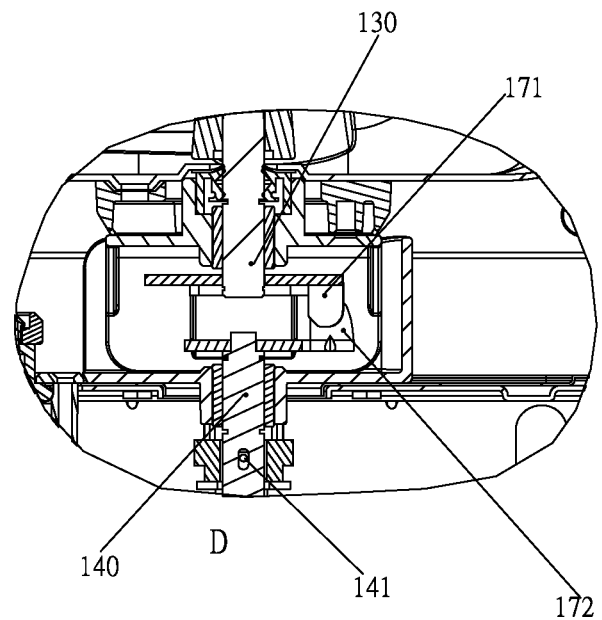
FIG. 8 illustrates the enlargement view of the D part in FIG. 6.
Figure 9:
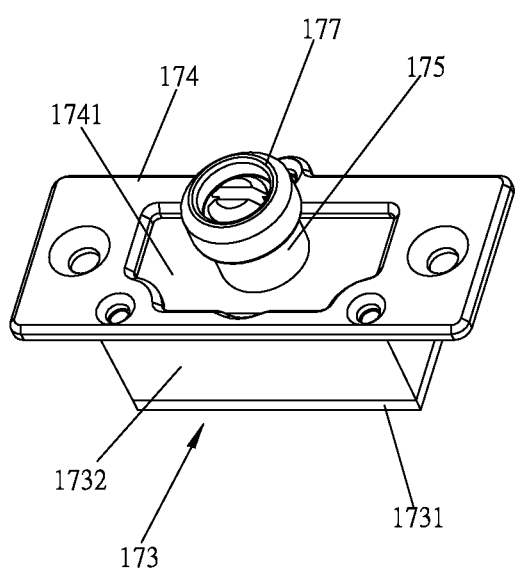
FIG. 9 illustrates the structure of the guide mechanism of the bread maker of the preferred embodiment of the present invention.

Thereinto: put into the container: please refer to FIG. 14-1, FIG. 14-2 and FIG. 14-3, when the container is sliding into the cavity and the two upper stand bases of the upper connector contacts with the guide wheel, the guide wheel touches the upper stand bases, making the upper connector rotated and the upper stand base entered in a pre-set angle, so that the upper stand base is away from the position coincided with the lower stand base of the lower connector, making the upper stand base entered without the interference of the lower stand base to cooperate with the lower connector. Get out of the container: to get out of the container after the baking, when the upper connector contacts with the guide wheel, the upper container presses the guide wheel down to make the guide wheel rotated about the groove, the spring is compressed to store energy, and the spring will release the energy to make the guide wheel repositioned after the container is taken out, and please refer to FIG. 13-1, FIG. 13-2. FIG. 13-3 and FIG. 13-4, when the container is taken out, the upper stand base is away without the interference of the lower stand base, the guide wheel works to guide the upper stand base, preventing interfering the upper stand base, making the container easy to draw out.

Figure 10:
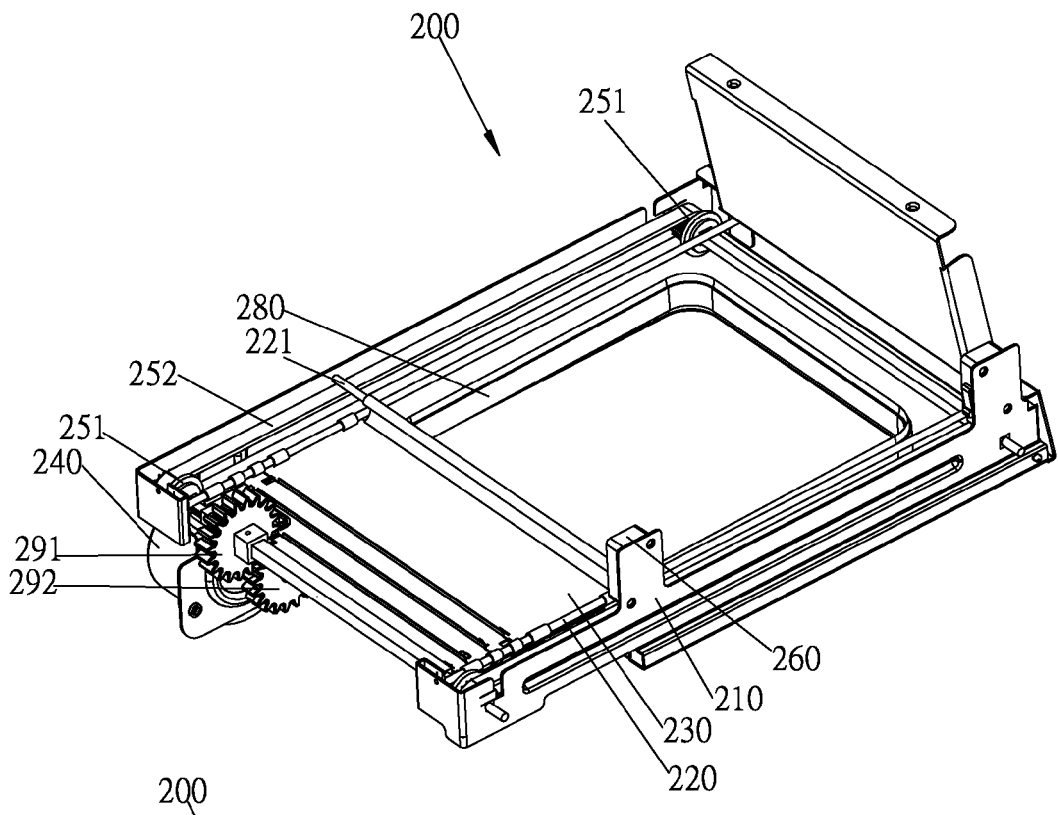
FIG. 10 illustrates the structure of the heat insulation mechanism of the bread maker of the preferred embodiment of the present invention.
Figure 11:
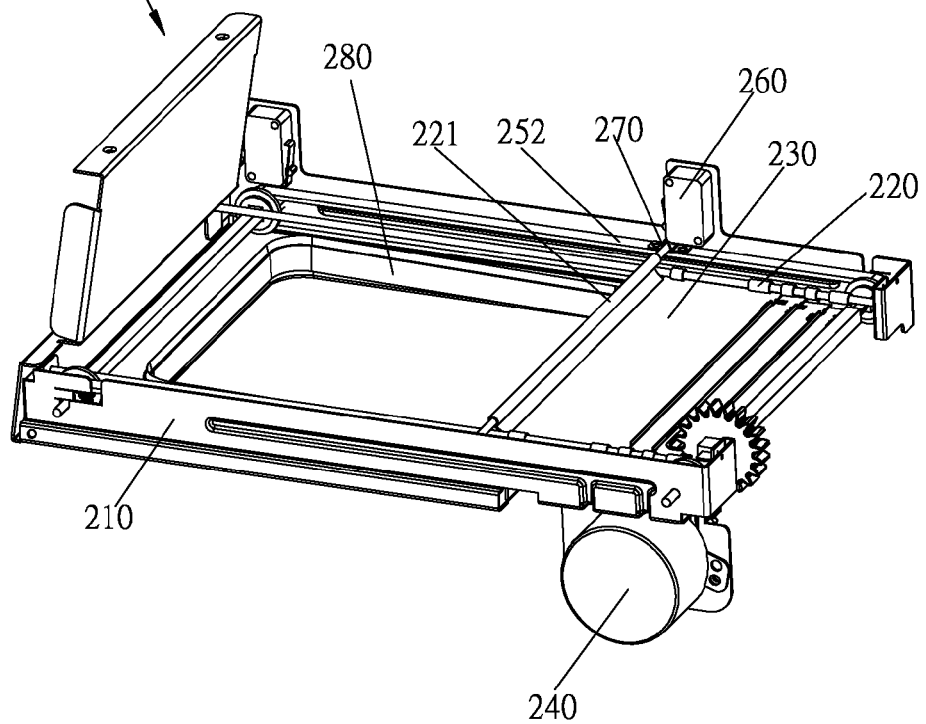
FIG. 11 illustrates the structure of the heat insulation mechanism of the bread maker of the preferred embodiment of the present invention in another view angle.

Please refer to the FIG. 10 and FIG. 11, the base 100 is disposed with a heat insulation mechanism 200 inside, the heat insulation mechanism 200 includes a heat insulation rack 210, a flexible mechanism 220, a belt driving mechanism, a heat insulation plate set 230, a power 240 and a temperature sensor in signal connection with the power 240, the flexible mechanism 220 can expand and contract along the longitudinal direction of the heat insulation rack 210, the heat insulation block set 230 is connected to the flexible mechanism 220 and it can fold and unfold with the flexible mechanism 220. the heat insulation rack 210 is a rectangle frame, the internal wall of which is disposed with a sealing ring 280, the power 240 is applied with a motor. The internal frame of the heat insulation rack 210 forms to be a heat insulation door, the heat insulation block set can cover the heat insulation door when it is unfolded, and it can open the heat insulation door when it is folded. The power 230 is in driving connection with the pulley 251 of the driving mechanism by gear 291 and gear 292. Two pulleys 251 of the belt driving mechanism are respectively disposed at two ends of the heat insulation rack 210 in the longitudinal direction. The flexible mechanism 220 is disposed with a to fixed end and a flexible end 221, the flexible end 221 can slide forward and backward relatively to the fixed end, and the flexible end 221 is fixed to the belt of the belt driving mechanism. The heat insulation block set 230 is disposed with at least two heat insulation blocks, which can expand and contract, one of two heat insulation blocks at two external sides when the heat insulation block set 230 expands is fixed to the side of the heat insulation rack 210 corresponding to the fixed end in the longitudinal direction, the external side of the other one is fixed to the flexible end 221.

In this embodiment, the belt 252 is disposed with a microswitch 260, the heat insulation rack 210 is disposed with a baffle 270, the microswitch 260 is coupled to the baffle 270 and in signal connection with the power 240.

When the cavity of the base 100 reaches to a certain temperature, the temperature sensor sends signal to the power to make it rotated in a clockwise direction to drive the main drive gear 251 to engage with the driven gear 251 to drive the belt 252 to move and drive the flexible end 221 to slide along the longitudinal direction, making the flexible mechanism expanded and the heat insulation blocks unfolded in rectilinear motion; when the baffle touches the microswitch the power is shut off, the heat insulation door is in close state, when the temperature of the cavity reduced to a certain value, the temperature sensor sends signal to the power to make the power rotated in anticlockwise direction, the heat insulation block turns back to unfold. When the baffle touches the microswitch, the power is shut off, and the heat insulation door is in open state.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a bread maker, in which a transmitting lamp and a receiver are respectively disposed at the two sides of the lower rotating shaft of the base in the position corresponding to the through hole; when the lower rotating shaft is rotated to a corresponding angle, the optical signal is irradiated on the receiver through the through hole to control the motor to implement automatic positioning.

What is claimed is:

1. A bread maker comprising a base comprising:
   a power member;
   a container including a mixing and kneading blade;
   an upper rotating shaft having a lower end, the upper rotating shaft pivotally joining the container and being in driving connection with the mixing and kneading blade;
   an upper connector including an upper fixed plate fixed at the lower end, the upper fixed plate having an upper stand base;
   a lower rotating shaft having an upper end, the lower rotating shaft pivotally joining the base;
   a lower connector including a lower fixed plate fixed at the upper end, the lower fixed plate having a lower stand base;
   the power member in driving connection with the lower rotating shaft, the lower rotating shaft defining a lower axis and having a through hole running perpendicularly to the lower axis; and
   an optical signal transmitting lamp and an optical signal receiver located at two sides of the lower rotating shaft at a position corresponding to the through hole, the receiver in signal connection with the power member;
   wherein:
   the container is adapted to move in a withdrawal direction perpendicular to the lower axis;
   the upper stand base is adapted to abut the lower stand base, and to form a driving connection between the lower rotating shaft and the upper rotating shaft; and
   the upper rotating shaft and the lower rotating shaft stop at a proper angle to prevent the lower stand base interfering the upper stand base when the container moves along the withdrawal direction.

2. A bread maker according to claim 1, wherein the transmitting lamp is freely sleeved on an outside of the lower rotating shaft.

3. A bread maker according to claim 1, further comprising a guide mechanism for guiding the upper connector.

4. A bread maker according to claim 1, further comprising:
   a second upper stand base, wherein the upper stand base and the second upper stand base are radially symmetrically situated on two sides of an upper axis of the upper rotating shaft, each of the upper stand bases has a first contact surface parallel to the upper; and
   a second lower stand base, wherein the lower stand base and the second lower stand base are radially symmetrically situated on two sides of the lower axis, each of the lower stand bases has a second contact surface parallel to the lower axis; and wherein the proper angle is formed when the second contact surface parallels the withdraw direction.

5. A bread maker according to claim 3, wherein
the guide mechanism comprises:
a bottom; an upper cover; a guide base having a pivot end pivotally joining the base and a lower withstand end, the guide base having a guide wheel for guiding the upper connector to cooperate with the lower connector, and a spring located between the lower withstand end and the bottom.

6. A bread maker according to claim 1, further comprising:
a heat insulation mechanism, the heat insulation mechanism comprising:
a heat insulation rack defining a longitudinal direction;
a flexible mechanism adapted to expand and contract along the longitudinal direction;
a heat insulation block set connected to the flexible mechanism and adapted to fold and unfold with the flexible mechanism;
a belt driving mechanism driving the flexible mechanism;
a heat insulation plate set;
a power in driving connection with the belt driving mechanism; and
a temperature sensor in signal connection with the power.

7. A bread maker according to claim 6, wherein
the flexible mechanism has a fixed end and a flexible end, and
the flexible end is connected to a belt of the belt driving mechanism.

8. A bread maker according to claim 7, wherein
the belt has a microswitch,
the heat insulation rack has a baffle,
the microswitch is coupled to the baffle and in signal connection with the power.

9. A bread maker comprising:
a base comprising:
a power member;
a container including a mixing and kneading blade;
an upper rotating shaft in driving connection with the mixing and kneading blade; and a lower rotating shaft in driving connection with the upper rotating shaft, the power member in driving connection with the lower rotating shaft, the lower rotating shaft defining a lower axis and having a through hole running perpendicularly to the lower axis;
an optical signal transmitting lamp and an optical signal receiver respectively located at two sides of the lower rotating shaft at a position corresponding to the through hole, the receiver in signal connection with the power member; and
a light blocking box sleeved on the lower rotating shaft and covering the transmitting lamp and the signal receiver.

10. A bread maker according to claim 9, wherein the transmitting lamp is freely sleeved on an outside of the lower rotating shaft.

11. A bread maker according to claim 9, further comprising a guide mechanism for guiding the upper connector.

12. A bread maker according to claim 9, wherein:
the upper rotating shaft pivotally joins the container, and has a lower end,
the base further comprises an upper connector and a lower connector,
the upper connector includes an upper fixed plate fixed at the lower end, the upper fixed plate having an upper stand base;
the lower rotating shaft has an upper end and pivotally joins the base,
the lower connector includes a lower fixed plate fixed at the upper end, the lower fixed plate has a lower stand base,
the container is adapted to move in a withdrawal direction perpendicular to the lower axis,
the upper stand base is adapted to abut the lower stand base, and to form a driving connection between the upper rotating shaft and the lower rotating shaft, and
the upper rotating shaft and the lower rotating shaft stop at a proper angle to prevent the lower stand base interfering the upper stand base when the container moves along the withdraw direction.

13. A bread maker according to claim 12, further comprising:
a second upper stand base, wherein the upper stand base and the second upper stand base are radially symmetrically situated on two sides of an upper axis of the upper rotating shaft, each of the upper stand bases has a first contact surface parallel to the upper axis and
a second lower stand base, wherein the lower stand base and the second lower stand base are radially symmetrically situated on two sides of the lower axis, each of the lower stand bases has a second contact surface parallel to the lower axis, and
wherein the proper angle is formed when the second contact surface parallels the withdraw direction.

14. A bread maker according to claim 11, wherein
the guide mechanism comprises:
a bottom; an upper cover a guide base having a pivot end pivotally joining the base and a lower withstand end, the guide base having a guide wheel for guiding the upper connector to cooperate with the lower connector, and a spring located between the lower withstand end and the bottom.

15. A bread maker according to claim 9, further comprising:
a heat insulation mechanism, the heat insulation mechanism comprising:
a heat insulation rack defining a longitudinal direction;
a flexible mechanism adapted to expand and contract along the longitudinal direction;
a heat insulation block set connected to the flexible mechanism and adapted to fold and unfold with the flexible mechanism;
a belt driving mechanism driving the flexible mechanism;
a heat insulation plate set;
a power in driving connection with the belt driving mechanism; and
a temperature sensor in signal connection with the power.

16. A bread maker according to claim 15, wherein
the flexible mechanism has a fixed end and a flexible end, and
the flexible end is connected to a belt of the belt driving mechanism.

17. A bread maker according to claim 16, wherein
the belt has a microswitch,
the heat insulation rack has a baffle,
the microswitch is coupled to the baffle and in signal connection with the power.

* * * * *